US011577438B2

(12) United States Patent
Wöstmann et al.

(10) Patent No.: US 11,577,438 B2
(45) Date of Patent: Feb. 14, 2023

(54) FILTERING DEVICE AND METHOD FOR OPERATING SAME

(71) Applicant: NORDSON CORPORATION, Westlake, OH (US)

(72) Inventors: Stefan Wöstmann, Sassenberg (DE); Markus Walbersmann, Schöppingen (DE); Robert Middler, Havixbeck (DE)

(73) Assignee: Nordson Corporation, Westlake, OH (US)

( * ) Notice: Subject to any disclaimer, the term of this patent is extended or adjusted under 35 U.S.C. 154(b) by 971 days.

(21) Appl. No.: 16/027,350

(22) Filed: Jul. 4, 2018

(65) Prior Publication Data

US 2019/0009448 A1  Jan. 10, 2019

(30) Foreign Application Priority Data

Jul. 7, 2017 (DE) .......................... 102017115295.4
Jun. 12, 2018 (EP) ...................................... 18177318

(51) Int. Cl.
| | | |
|---|---|---|
| B29C 47/68 | (2006.01) | |
| B29C 48/25 | (2019.01) | |
| B29C 48/694 | (2019.01) | |
| B29C 48/92 | (2019.01) | |
| B29C 48/76 | (2019.01) | |
| B29C 48/27 | (2019.01) | |
| B29C 48/691 | (2019.01) | |
| B29C 37/00 | (2006.01) | |

(52) U.S. Cl.
CPC ........ *B29C 48/252* (2019.02); *B29C 48/2725* (2019.02); *B29C 48/694* (2019.02); *B29C 48/6912* (2019.02); *B29C 48/76* (2019.02); *B29C 48/92* (2019.02); *B29C 2037/96* (2013.01); *B29C 2948/92019* (2019.02); *B29C 2948/92076* (2019.02); *B29C 2948/9299* (2019.02); *B29C 2948/92495* (2019.02); *B29C 2948/92571* (2019.02)

(58) Field of Classification Search
CPC ..... B29C 48/252; B29C 48/694; B29C 48/76; B29C 48/92; B29C 48/2725; B29C 48/6912; B29C 2948/92495; B29C 2948/92571; B29C 2948/9299; B29C 2948/92076; B29C 2948/92019; B29C 2037/96; B29C 47/68; B29C 47/681; B29C 47/687; C02F 1/00
USPC .......................................................... 210/91
See application file for complete search history.

(56) References Cited

U.S. PATENT DOCUMENTS

| | | | | |
|---|---|---|---|---|
| 4,701,118 A | * | 10/1987 | Koching | ............. B29C 48/6912 425/185 |
| 2008/0217255 A1 | * | 9/2008 | Pohl | .................... B29C 48/6912 210/739 |
| 2011/0017681 A1 | * | 1/2011 | Bibey | ................. B29C 48/6912 210/791 |

FOREIGN PATENT DOCUMENTS

| | | |
|---|---|---|
| AT | 413654 | 11/2008 |
| CN | 102343658 A | 2/2012 |

(Continued)

*Primary Examiner* — Akash K Varma
(74) *Attorney, Agent, or Firm* — BakerHostetler

(57) ABSTRACT

The invention relates to a filtering device for filtering a fluid, and in particular a liquefied plastic. The filtering device includes a control unit to control the position of a screen carrier by generating control signals such that the fluid pressure in a fluid inlet channel and/or in a fluid outlet channel remains within definable pressure ranges while a cavity is being filled.

20 Claims, 10 Drawing Sheets

(56) References Cited

FOREIGN PATENT DOCUMENTS

| | | |
|---|---|---|
| DE | 102005037268 A1 | 2/2006 |
| DE | 102006019445 A1 | 10/2007 |
| DE | 102007057816 A1 | 6/2009 |
| JP | 2012-218403 A | 11/2012 |
| JP | 2014-083769 A | 5/2014 |
| WO | 2010/138602 A1 | 12/2010 |

* cited by examiner

FILTERING DEVICE AND METHOD FOR OPERATING SAME

TECHNICAL FIELD

The invention relates to a filtering device for filtering a fluid, in particular a liquefied plastic. The filtering device comprises a housing having a receptacle for receiving a screen carrier and having a fluid inlet channel and a fluid outlet channel, a screen carrier movable inside the screen carrier receptacle and having at least one cavity for receiving a screen support plate having a filter element, the screen carrier being movable from a filtering position into a screen replacement position, the screen carrier and/or the receptacle having at least one filling recess for filling the cavity with fluid, which releases a flow cross-section whose size depends on the position of the screen carrier in the receptacle to feed fluid from the fluid inlet channel or the fluid outlet channel into the cavity, the screen carrier having at least one ventilation recess for releasing any air which is in the cavity during filling.

The invention also relates to a method for operating a filtering device for filtering a fluid, in particular for replacing a filter element of the filtering device.

BACKGROUND

Filtering devices are used in plastics processing machines, for example, when the purity of the plastic being processing must meet tough requirements. They are typically arranged between an extruder, which melts and conveys the plastic, and an applicator. Such filtering devices for filtering a fluid, in particular a liquefied plastic, and methods therefor are known from the prior art. DE 10 2007 057 816 A1, for example, describes such a filtering device comprising a screen carrier on which a screen is arranged.

Such a screen must be replaced or cleaned when it has been in operation for some time. In such a case, the screen carrier is moved from the production position (filtering position) into a screen replacement position. Once the screen has been replaced, the screen carrier must be brought back into the production process.

The challenge this poses is that the interior spaces of the screen carrier (cavity) are typically filled with air and that it is essential to prevent air from being introduced into the stream of plastic fluid.

For that reason, the screen carrier is firstly moved into a ventilation position after a screen replacement. In the ventilation position, liquefied plastic flows into the screen cavity, thus displacing any air therein from the screen cavity. The filling speed of the cavity can be regulated with the aid of a filling recess or a drainage groove. The screen carrier cannot be moved into its filtering position until the screen cavity has been completely filled with liquefied plastic. In addition to screen carriers which have a single cavity, other screen carriers are known from the prior art, which have a plurality of cavities, for example two or four cavities, which may be spaced apart from each other along a longitudinal axis of the screen carrier, for example.

Since the plastic flowing in is taken from the stream of fluid plastic to be filtered, filling the cavity poses a special challenge in that it has a negative effect on the system pressure if the cavity is filled too quickly from the stream of fluid plastic. If the cavity is filled too quickly and the fluid feed rate is constant, this results in an undesired drop in pressure within the system.

With that as motivation, DE 10 2006 019 445 A1 describes a method for controlling a plastics processing system. The aim of the method is to compensate for variations in pressure caused by filling a screen carrier cavity, as described above, by increasing the feed rate of a conveying device by regulating the rotational speed of a gear pump while simultaneously moving a screen carrier.

The disadvantage of the prior art described above is the delay in regulation between the drop in system pressure caused by filling the cavity, and the adjustment of the pump output. As a consequence, it is not possible for pressure variations to be ruled out with sufficient certainty, especially when the cavity is filled too quickly. Furthermore, this way of controlling the pump output according to the screen replacement operation is a factor which increases the complexity of the plastics processing machine on the whole, thus resulting in increased production costs and servicing work required for such a machine.

SUMMARY

Given this background, the object of the invention is to develop a device and a method of the kind initially specified in such a way that the disadvantages identified in the prior art are eliminated as far as possible. More particularly, the object of the invention is to specify a device and a method which allow a screen replacement operation, in particular when materials and recipes are frequently changed, in which the overall system pressure is kept largely constant and in which the complexity of the system is reduced on the whole.

According to a first aspect of the invention, this object is achieved in the device of the kind initially specified by a control unit which is configured and adapted in such a way that it changes the position of the screen carrier in steps and repeatedly or continuously by means of control signals (claim 1).

By means of the inventive control unit, the position of the screen carrier can be changed in such a way that the effective free cross-section of flow for filling the screen carrier cavity is selected so that pressure variations in the fluid inlet channel or the fluid outlet channel are reduced, minimized, or totally prevented. Even if reference is made in the following to a screen carrier cavity, this also includes screen carriers which have a plurality of cavities, for example two or four cavities.

Changing the position of the screen carrier in steps and repeatedly or continuously is a rapidly effective and efficient measure for maintaining the overall system pressure within predefined limits during screen replacements. This preferably obviates the need to adjust the pump output of a hot-melt pump, for example by changing the rotational speed of the drive means of the pump. Stepped and repeated or continuous control in accordance with the invention acts advantageously on the cause of pressure variations, namely the cavity filling speed, which is affected by the position of the screen carrier. The free cross-section of flow for filling the cavity can thus be adjusted very precisely and varied in such a way that there are only very slight, negligible effects on the fluid pressure in the system. Any deviations from the set system pressure which exceed the permitted thresholds can thus be quickly compensated by reducing the cavity filling speed by moving the screen carrier. A direct influence is thus exerted advantageously on the cause of the pressure drop. By moving the screen carrier, the cross-section of flow into the cavity can be adjusted carefully, precisely and without delay, in steps and repeatedly or continuously, and the cavity can be filled slowly depending on the pressure in the system. According to the invention, adjustment of the fluid pump output in a disadvantageous manner is avoided.

When such a control unit is used, it is also possible for screen replacement operations to be repeated. This enhances the quality of the process and also minimizes the risk of the screen replacement operation producing pockets of trapped air in the fluid.

The fluid pressure in the fluid inlet channel and/or in the fluid outlet channel can remain advantageously and preferably within definable pressure ranges while the cavity is being filled, with at least one pressure sensor being provided for measuring the fluid pressure in the fluid inlet channel and/or in the fluid outlet channel.

The invention is advantageously developed by configuring and adapting the control unit in such a way that it changes the position and/or feed speed of the screen carrier by means of control signals in steps and repeatedly, or continuously, in such a way that the fluid pressure in the fluid inlet channel and/or in the fluid outlet channel remains within definable pressure ranges while the cavity is being filled. In this preferred embodiment, the feed speed of the screen carrier is advantageously influenced and selected such that the screen carrier cavity fills so slowly that the fluid pressure in the fluid inlet channel and/or in the fluid outlet channel remains within definable pressure ranges while the cavity is being filled, without the pressure necessarily having to be monitored. The screen carrier can preferably be moved forward in steps and repeatedly or continuously. The alternative solution utilizes the realization that moving the screen carrier forward very slowly can ensure, even without monitoring the pressure, that the fluid pressure in the fluid inlet channel and/or in the fluid outlet channel remains within definable pressure ranges while the cavity is being filled.

The invention is developed by designing the screen carrier as a screen plug which is axially movable in steps inside the receptacle, i.e. can be moved a particular distance which can be adjusted again and again, and by the filling recess extending substantially parallel to the longitudinal axis of the screen plug.

Designing the screen carrier as a screen plug simplifies handling and the insertion of such a screen plug into the housing. Screen replacement is also made easier. The filling recess arranged parallel to the longitudinal axis of the screen plug can also be realized particularly easily from the production engineering perspective. The axial movement of the screen plug also allows the mass flow of fluid to be controlled with optimized dosage when filling the cavity.

It is also preferred that the filling recess be designed as a groove (also called a drainage groove) which has a change in cross-section in the direction of the longitudinal axis and/or a substantially triangular cross-section.

Such a change in the cross-section of the groove, particularly in the form of a triangular cross-section, also supports an optimally dosed and finely controlled flow of fluid into the cavity during the filling operation. Such a design is also advantageous with regard to the use of different fluids, because it is possible, depending on the property of the fluid, for example its viscosity, to select an optimal ventilation recess area and thus to fill the cavity with an optimal mass flow, the aim being that the system pressure remains within specific threshold values and is not affected at all or only very slightly by the cavity being filled.

According to one preferred development of the invention, the screen carrier is driven by a drive means which is provided in the form of an electrical drive, in particular a linear motor or a stepper motor.

Such a drive means, particularly an electrical drive in the form of a linear motor or stepper motor, allows the screen carrier to be driven with precision, thus allowing the screen carrier to be moved exactly to desired positions, for example to a ventilation position.

The invention is further developed by the screen carrier having a position sensor for determining the position of the screen carrier and which is preferably provided in the form of an ultrasonic transducer. The advantage of such a sensor is that the exact position of the screen carrier can be sensed and can be fed back to the control unit. This provides a monitoring function and an overall improvement of the process quality.

The filtering device is also designed in such a way that the control unit has a data memory and adjusts control parameters on the basis of stored sensor data from previous filling operations, in particular with regard to filling positions and feed speeds of the screen carrier and/or filling times for the cavity.

Such self-learning functions again serve to increase the process quality and to reduce the screen replacement time. Such functions also make it easier to use different fluids. The operator is also relieved of much record-keeping and calculation work.

The invention is developed by the control unit having a user interface which is provided in the form of a control panel and/or as a touch-sensitive display.

Designing the user interface in this way provides the advantage that information can be obtained more intuitively and input can be entered more easily, with the result that time can be saved, the operating comfort can be enhanced, and the process quality can be further increased by reducing operating errors.

In a second aspect of the invention, the object is achieved by a method in which the screen carrier is moved from a filtering position into the screen replacement position, the filter element is removed from the cavity and a new filter element is inserted into the cavity, and the position of the screen carrier is set by means of the control unit and the drive means in steps and repeatedly or continuously in such a way that the filling recess is brought into fluid communication with the fluid inlet channel and/or the fluid outlet channel in order to fill the cavity.

With regard to the benefits of the second aspect of the invention, reference is made to the advantages already discussed in the foregoing.

The method is advantageously developed by the fluid flowing through the filling recess into the cavity, by air from the least one ventilation recess flowing out of the cavity, and by the fluid pressure in the fluid inlet channel and/or in the fluid outlet channel remaining within definable pressure ranges while the cavity is being filled.

According to another preferred embodiment, the method includes the steps of advancing the screen carrier into a starting position, continuously advancing the screen carrier or advancing the screen carrier stepwise and repeatedly with a definable feed speed, and keeping the screen carrier in a definable feed position until the cavity has been completely filled.

The feed speed of the screen carrier is preferably influenced in the process, and in any case is selected such that the cavity fills so slowly that the fluid pressure in the fluid inlet channel and/or in the fluid outlet channel is subject to minimal or no fluctuations and preferably remains within definable pressure ranges while the cavity is being filled.

The method can be developed by the steps of advancing the screen carrier into a starting position, measuring the pressure in the fluid inlet channel and/or the fluid outlet channel fluid and storing the at least one pressure measurement, advancing the screen carrier by one clock step, keeping it in that position for one clock pause, measuring the fluid pressure in the fluid inlet channel and/or fluid outlet channel, comparing the at least one measured value with the at least one stored pressure value.

The steps allow a pressure value measured prior to screen replacement to be compared particularly advantageously with a pressure value measured while the cavity is being filled. Due to viscosity of the fluid, the screen carrier remains in its position for a defined period prior to the measurement of pressure, in order to normalize pressure conditions and to produce reliable measurements.

It is preferred that the method also comprises the steps of, if there is no reduction in pressure compared to the stored pressure value, advancing the screen carrier further by one clock step and keeping it in that position for one clock pause, and in this case, repeating the step, if, after a clock pause, there is a reduction in pressure by more than one threshold value compared to the stored value, retracting the screen carrier by a first retraction distance, repeating the step, if, after a clock pause, there is reduction in pressure by an amount which is within the threshold, continuing with the next step, keeping the screen carrier in the respective feed position until the cavity has been completely filled.

The iterative steps described above allow very precise adjustment of the feed position of the screen carrier and its optimization with regard to the overall system pressure.

If the system pressure does not change when the screen carrier is in a first feed position, the screen carrier is moved further forward so that the cross-section between the fluid inlet and the drainage opening increases, thus allowing more fluid to enter the cavity. If, however, the overall system pressure falls to such an extent when a particular feed position of the screen carrier is reached that the pressure falls below a predefined threshold value, the screen carrier is retracted by a first retraction distance.

The system pressure is stabilized as a result. If, finally, a filling position is found at which the pressure remains within the predefined threshold values, and the cavity is simultaneously filled sufficiently, the screen carrier remains in that position until the cavity of the screen carrier is completely filled.

According to an alternative embodiment, the method comprises the steps of advancing the screen carrier into a starting position, measuring the pressure in the fluid inlet channel and/or fluid outlet channel and storing the at least one pressure measurement, continuously advancing the screen carrier with a definable feed speed, continuously measuring the fluid pressure in the fluid inlet channel and/or fluid outlet channel, comparing the at least one measured value with the at least one stored pressure value.

The steps described above allow very precise adjustment of the feed position of the screen carrier and its optimization with regard to the overall system pressure.

If the system pressure does not change, or changes only slightly, when the screen carrier is in a first feed position, the screen carried is moved continuously forward so that the free cross-section of flow between the fluid inlet channel and the drainage opening becomes greater, thus allowing more fluid to enter the cavity. If, however, the overall system pressure falls to such an extent when a particular feed position of the screen carrier is reached that the pressure falls below a predefined threshold value, the screen carrier is retracted by a first retraction distance.

The system pressure is stabilized as a result. If, finally, a filling position is found at which the pressure remains within the predefined threshold values, and the cavity is simultaneously filled at an adequate filling rate, the screen carrier remains in that position until the cavity is completely filled.

According to a preferred development of the invention, the method also comprises the step of: storing the feed position and using said position for subsequent cycles.

This is the basis for the self-learning functions of the method. Storing parameters from previous cycles, which have been found, for example, to be optimal positions of the screen carrier for filling with a particular fluid, allows that position to be moved to quickly in future cycles, thus speeding up the process while enhancing the process quality.

The method is developed such that, in the event of a reduction in pressure compared to the stored pressure value by more than a threshold value, after a clock pause, the method further comprises the steps of measuring the fluid pressure in the fluid inlet channel and/or fluid outlet channel and comparing it with the at least one stored pressure value, and if, after a clock pause, there is a reduction in pressure by more than the threshold value compared to the stored pressure value, retracting the screen carrier further by a second retraction distance, moving it into the ventilation position and performing a new cycle with a reduced clock step.

The advantage of reducing the clock step, as envisaged in these steps of the method, is that it ensures an appropriate filling position is found. As time progresses, the method becomes more tightly controlled with regard to the clock step, if an appropriate filling position cannot be found with the larger, initially predefined clock steps.

All in all, an economical approach to finding the filling position is thus proposed.

Further features and advantages of the invention ensue from the attached claims and the following description, in which embodiments are described in more detail with reference to schematic drawings.

DETAILED DESCRIPTION

Figure 1:
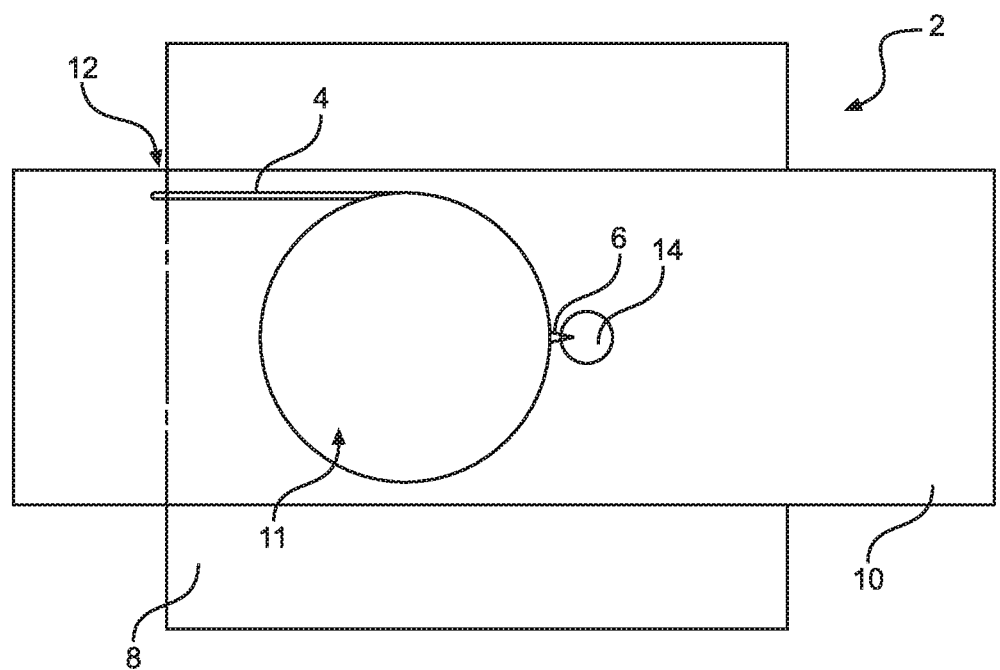
FIG. 1 shows a first embodiment of a filtering device according to the invention, in a cross-sectional view.

FIG. 1 shows a filtering device 2 which has a housing 8. Housing 8 has a receptacle 12 for receiving a screen carrier 10 which is provided in the form of a screen plug 10, in the Figures that follow.

It should be noted that alternative designs of a screen carrier, for example a plate-shaped screen carrier and the like, are explicitly included in the extent of protection.

Figure 2:
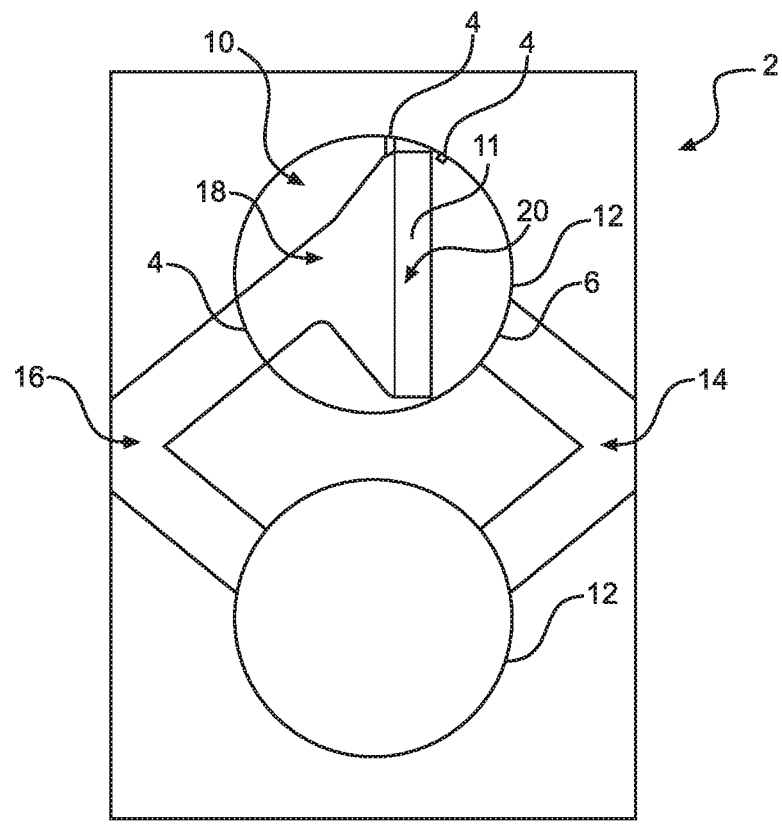
FIG. 2 shows the embodiment of the filtering device according to the invention, in a further cross-sectional view.

A filter element 11 is disposed in screen plug 10. Screen plug 10 also has ventilation recesses 4. Screen plug 10 also has a filling recess 6. It is possible by means of filling recess 6 to fill screen plug 10, or the cavity arranged inside it (cavity 18, see FIG. 2), by selectively connecting it to fluid inlet channel 14. During the filling operation, ventilation recess 4 is used to release air to the surroundings. The fluid required to fill the cavity is taken from fluid inlet channel 14. In the Figures, both fluid inlet channel 14 and fluid outlet channel 16 are designed so that they are in fluid communication with the top receptacle 12 and the bottom receptacle 12 when there is a screen plug 10 in the respective receptacle 12. In FIG. 2, filtering device 2 is shown in a cross-section perpendicular to the longitudinal axis of screen plug 10. Housing 8 has a total of two receptacles 12 for receiving screen plugs 10. In the example shown, however, only one screen plug 10 is inserted in the upper receptacle 12.

The upper screen plug 10 has a screen plate 20 having a filter element 11. Ventilation recesses 4 can be seen, as can filling recess 6 which can be brought into fluid communication with fluid inlet channel 14, depending on the axial position of screen plug 10.

The cavity 18 in screen plug 10 can also be seen in FIG. 2. During the filling operation, more particularly, said cavity 18 is filled with fluid via filling recess 6, and any air initially found in cavity 18 is released to the surroundings via ventilation recesses 4.

When screen plug 10 is in a filtering position, the fluid flows from fluid inlet channel 14 into screen plug 10, is filtered by filter element 11 and subsequently flows out of filtering device 2 via fluid outlet channel 16, for example in the direction of an applicator (not shown, see FIGS. 5 and 6).

Figure 3A:
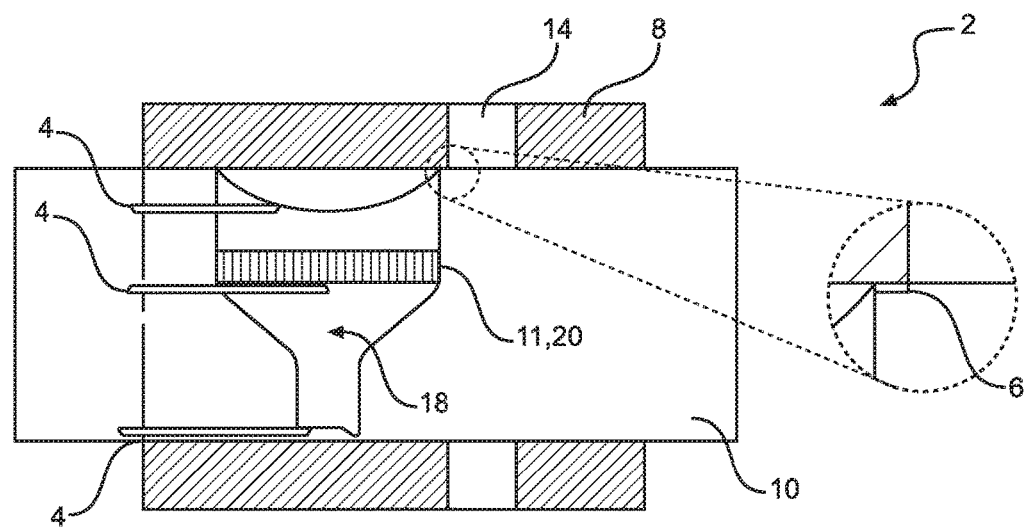
FIGS. 3a-d show the embodiment of the filtering device according to the invention in cross-sectional views relative to the longitudinal axis of the screen carrier, with different steps in the process of filling the screen plug being shown.

The filling operation and the steps necessary to perform it are shown in more detail in FIGS. 3a-3d. In FIG. 3a, screen plug 10 is initially in a starting position in housing 8. As can be seen from FIG. 3a, filling recess 6 is already in fluid communication with fluid inlet channel 14 to a slight degree. This has the consequence that small amounts of fluid flow into the cavity 18 of screen plug 10. The air trapped in cavity 18 can be released to the surroundings via ventilation recesses 4.

Figure 3B:
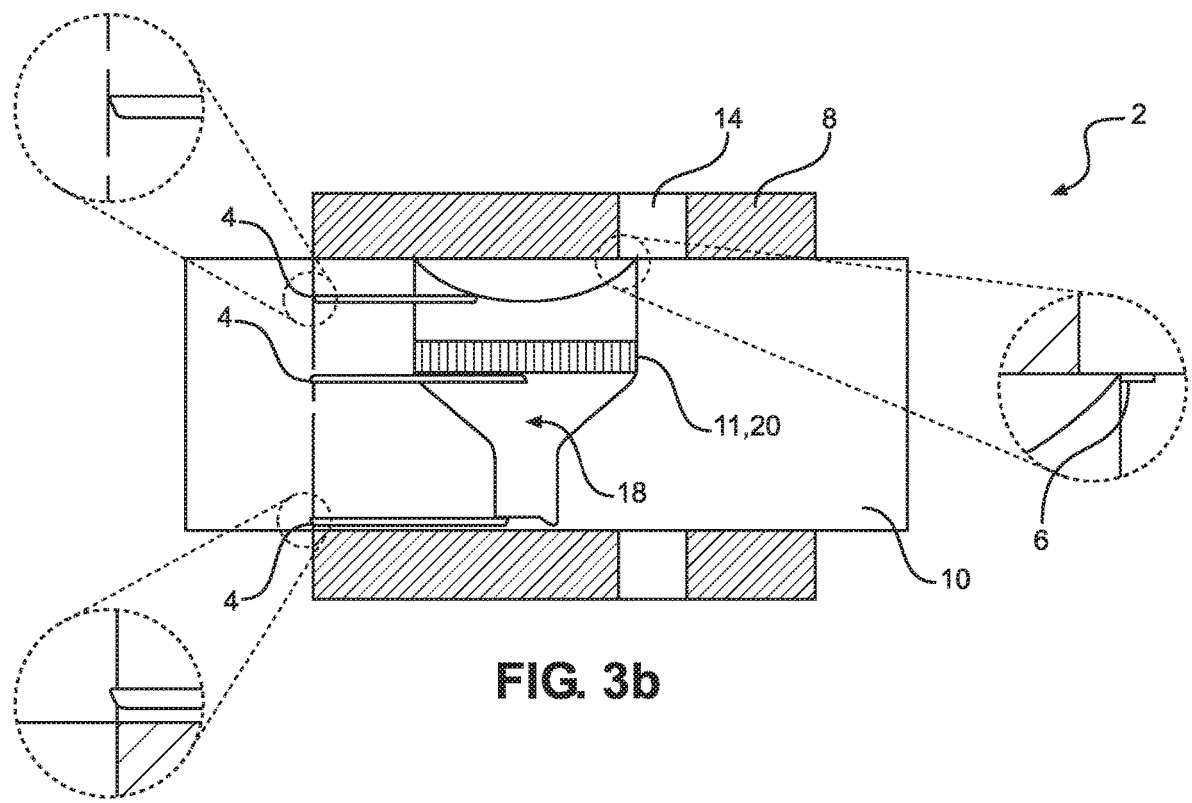
Figure 3C:
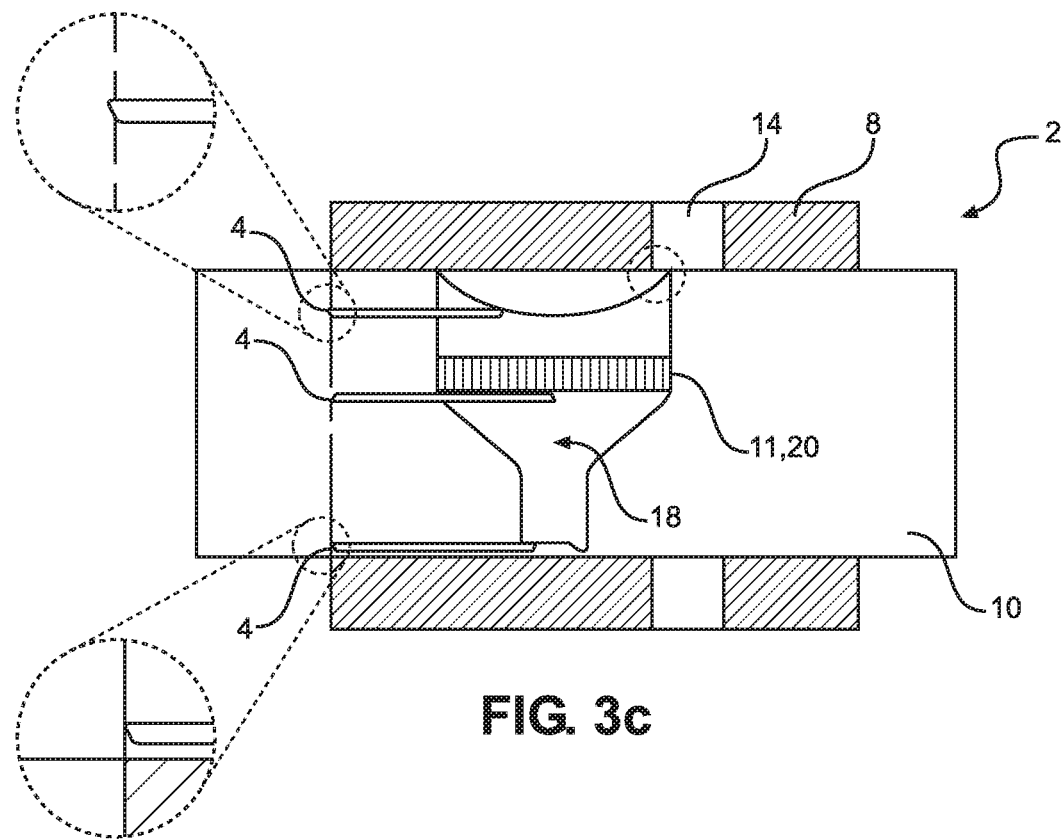
Figure 3D:
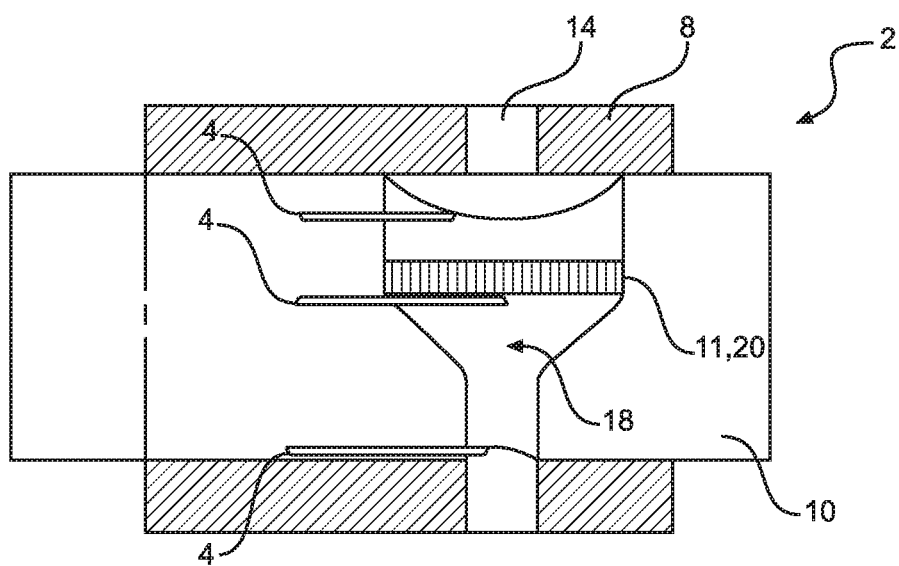

In FIG. 3b, screen plug 10 has been advanced so far to the right that a larger opening is provided between fluid inlet channel 14 and cavity 18. The consequence is an increase in the mass flow of the fluid in the direction of the cavity, with the result that the latter is filled more rapidly. Finally, after cavity 18 has been completely filled, screen plug 10 is advanced via intermediate step 3c further to the right and is brought into its filtering position in step 3d.

Figure 4A:
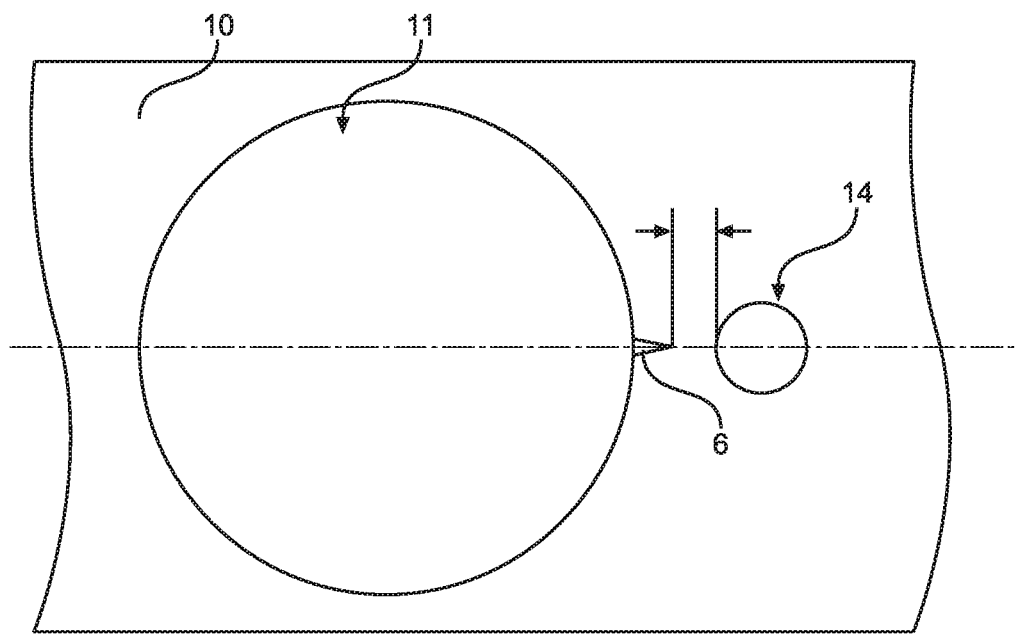
FIGS. 4a-c show the embodiment of the filtering device according to the invention in cross-sectional views, with different steps in the process of advancing the screen plug being shown.

FIG. 4a shows screen plug 10 with filter element 11, in the familiar manner. Filling recess 6 can also be seen, as can fluid inlet channel 14.

Figure 4B:
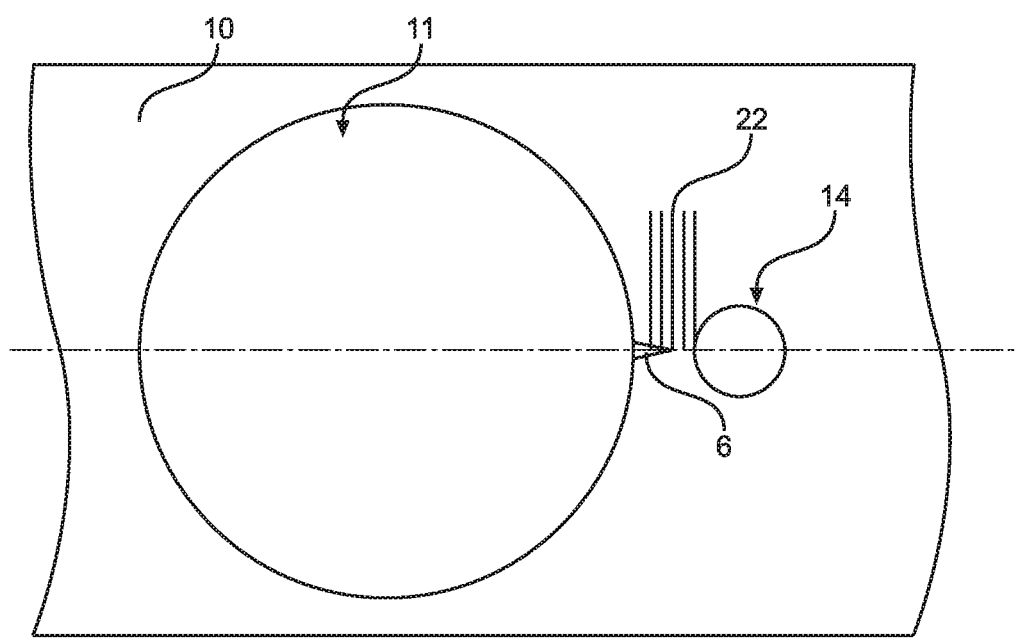

As can be seen from FIG. 4b, the control process involves screen plug 10 being advanced in discrete clock steps 22 in the direction of fluid inlet channel 14 to the right in the present Figure. Control unit 30 is responsible for controlling the forward movement of screen plug 10 in such a way that the cavity is adequately filled by connecting filling recess 6 to fluid inlet channel 14, but keeping the overall system pressure within predefined limits.

Figure 4C:
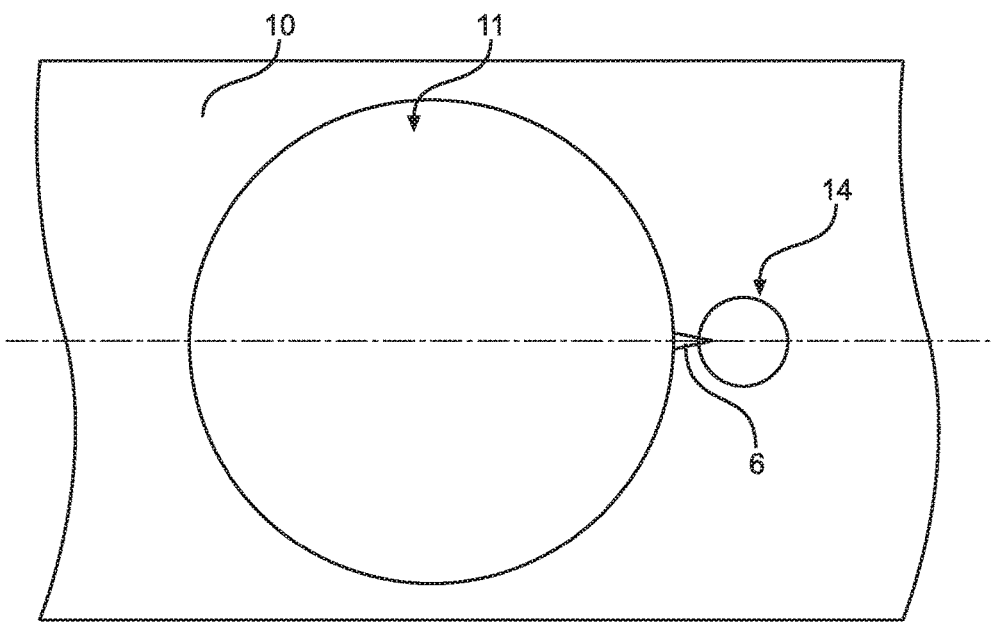

FIG. 4c shows a ventilation stop position, by way of example. This is the position of screen plug 10 relative to the surrounding housing 8, in which position filling recess 6 is in fluid communication with fluid inlet channel 14 such that cavity 18 is filled and the system pressure remains within predefined threshold values. This position is dependent on the fluid, in particular, and needs to be determined anew each time the cycle is performed.

Figure 5:
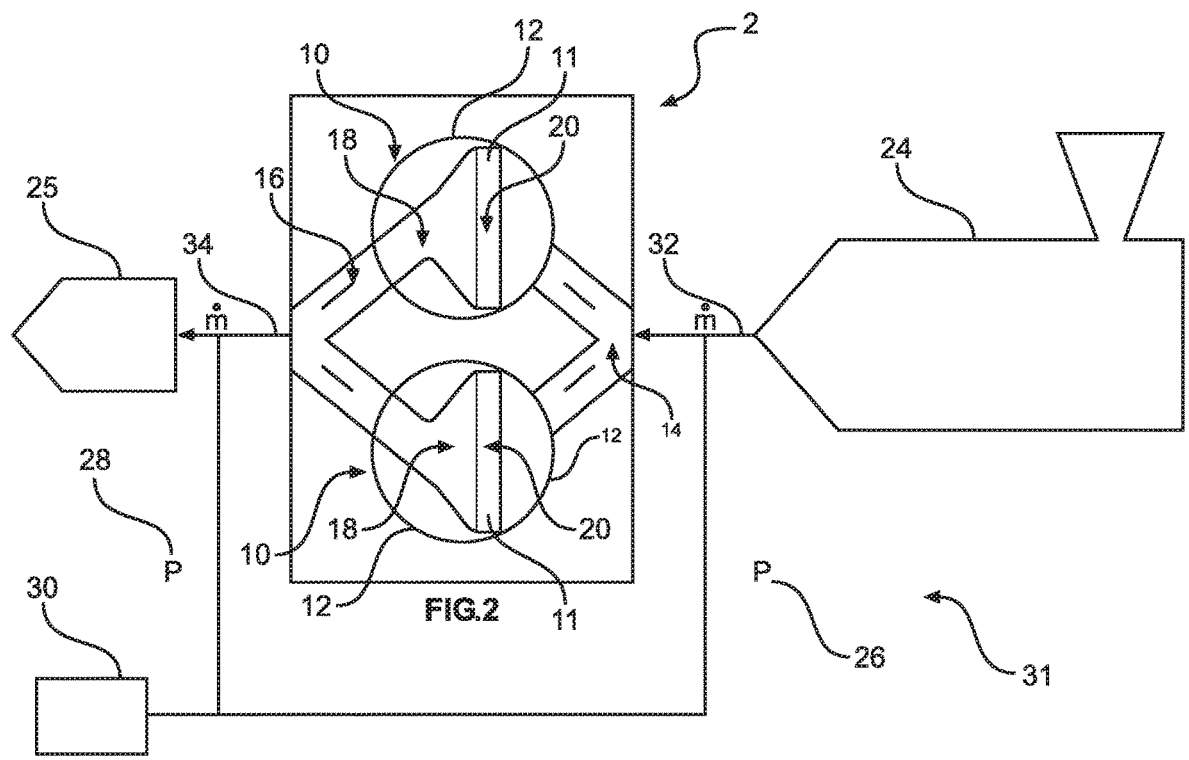
FIG. 5 shows the embodiment of the filtering device according to the invention in a hot melt adhesive application system.

FIG. 5 shows filtering device 2 embedded in a hot melt adhesive application system 31. Hot melt adhesive application system 31 has a liquefying and conveying means 24. Solid plastic, mostly in the form of granulate, is liquefied therein by heating it, after which it is conveyed by a pump integrated into the liquefying and conveying means 24 in the direction of an applicator 25. A line 32 is arranged between liquefying and conveying means 24 and fluid inlet channel 14.

To ensure that the fluid reaches applicator 25 in high quality and without any solid material trapped therein, the fluid passes through filtering device 2. In a familiar manner, filtering device 2 has a housing 8 which has two screen plug receptacles 12. As FIG. 5 shows, both screen plugs 10 are in a filtering position and filter the fluid. The filtered fluid now flows via a line 34 to applicator 25.

There are also pressure sensors 26, 28 arranged in lines 32 and 34: input pressure sensor 26 in line 32 and output pressure sensor 28 in line 34. The system pressure is monitored by means of pressure sensors 26 and 28.

Figure 6:
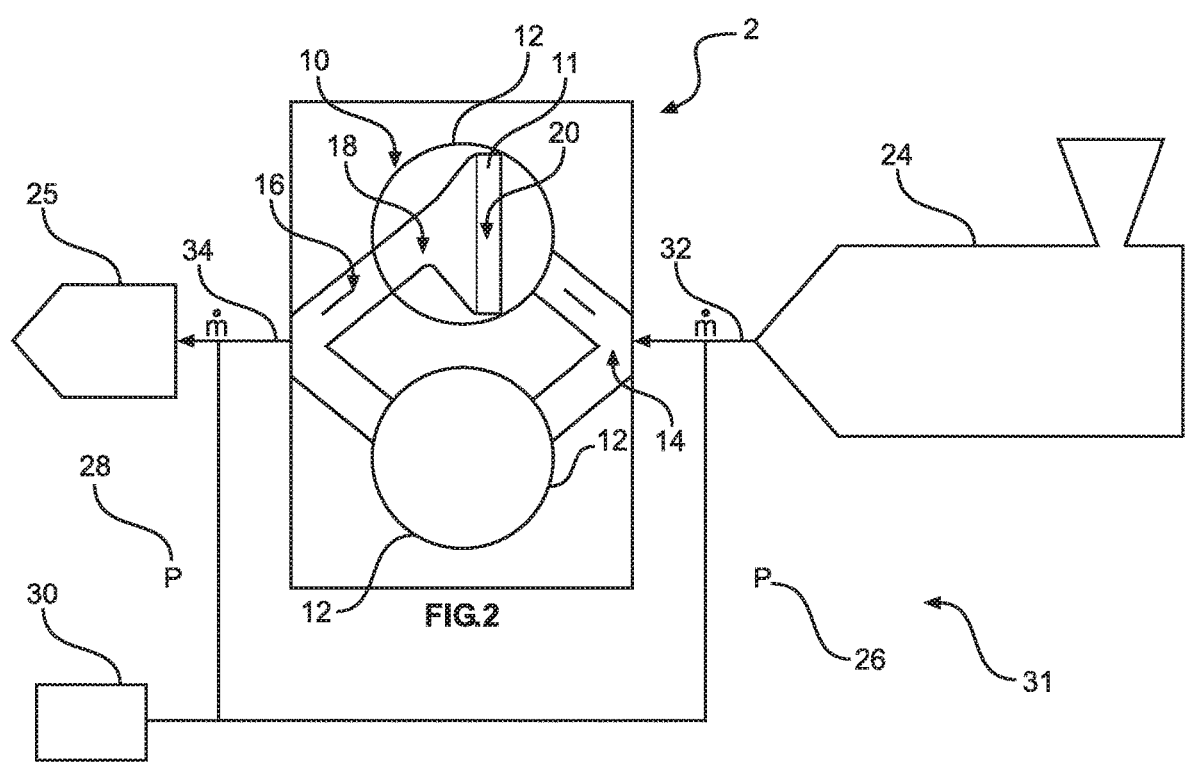
FIG. 6 shows the embodiment of the filtering device according to the invention in a hot melt adhesive application system, in which one of the screen carriers has been removed from the arrangement.

FIG. 6, finally, shows the same hot melt adhesive application system 31, in which the bottom screen plug 10 is not shown in the Figure in question.

Figure 7:
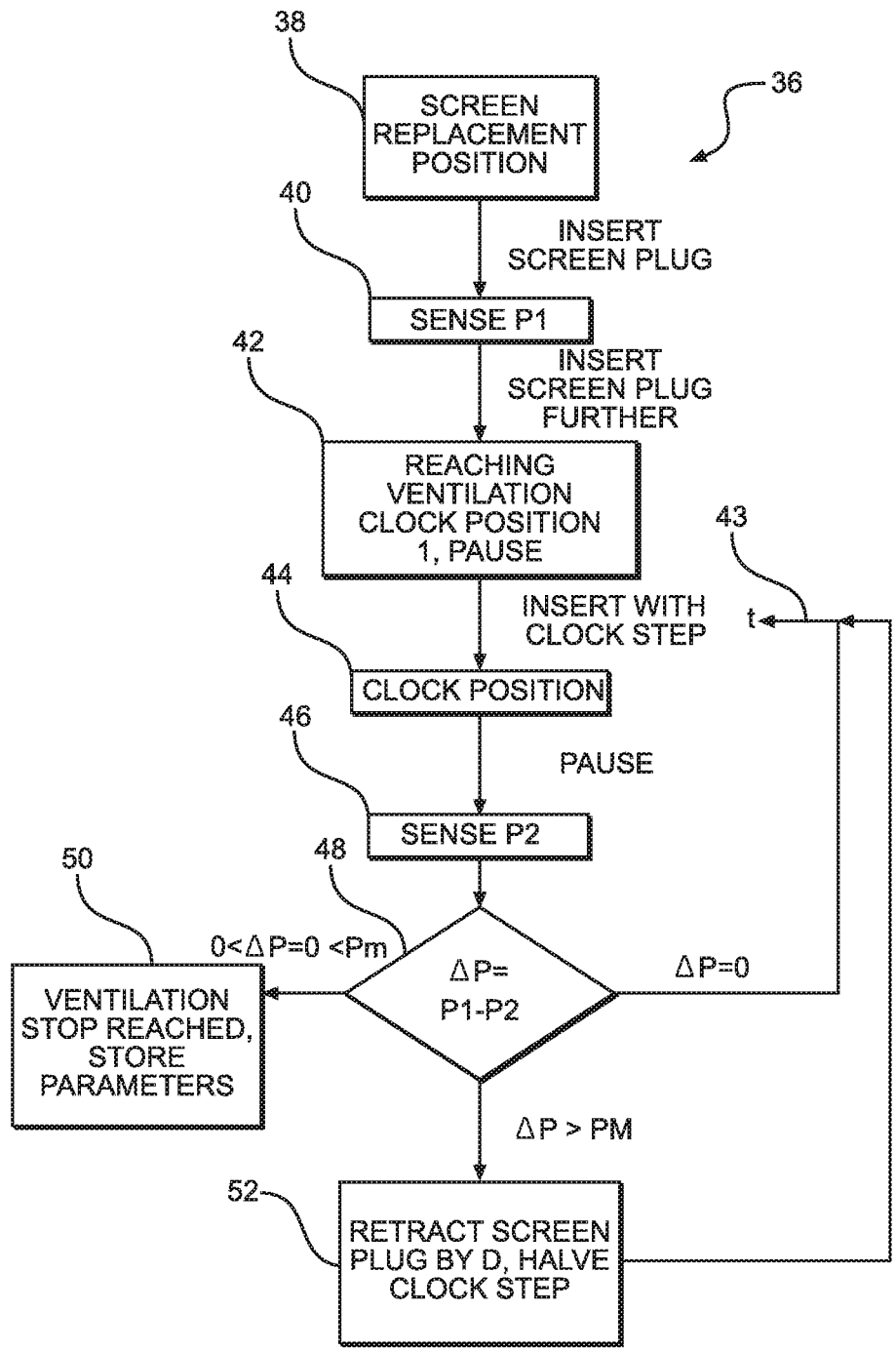
FIG. 7 shows a flow diagram of the method according to the invention for operating a filtering device.

FIG. 7 shows a flow diagram 36 for operating a filtering device 2. The point of departure is screen replacement position 38. Screen plug 10 is located here in a position that allows filter element 11 to be replaced. In this position, screen plug 10 is not used to filter the fluid.

After filter element 11 has been replaced, screen plug 10 is now moved partially into the corresponding screen plug receptacle 12. Before a first ventilation clock position is reached, pressure P1 is measured (step 40). In principle, said pressure P1 may include not only measurement of the input pressure of the filtering device by means of input pressure sensor 26, but also measurement of the output pressure of the filtering device by means of output pressure sensor 28, or a combination of both.

After the ventilation clock position has been reached (step 42), the process is paused. Screen plug 10 is then advanced by a further incremental amount with clock step 22, which corresponds to a predefined insertion distance. After this clock position 44 has been reached and a pause has elapsed, pressure P2 is subsequently measured anew (step 46). This pressure may relate to the input pressure of the filtering device (input pressure sensor 26) and/or to the output pressure of the filtering device (output pressure sensor 28). This pressure P2 which has now been measured is now subtracted in step 48 from the pressure P1 measured in step 40.

Depending on the result of subtraction, a distinction is made between three cases:

In a first case, no drop in pressure has occurred after performing clock step 22, which means that P1 is equal to P2 or that the pressure difference measured is less than a threshold value to be defined. In this case, it is necessary to continue inserting screen plug 10, and the method restarts with step 43. In relation to screen plug 10, the advancement of screen plug 10 was still not sufficient at this point to connect filling recess 6 with fluid inlet channel 14 in such a way that a sufficient amount of fluid flows into cavity 18.

In a second case, the pressure difference measured in step 48 is greater than a total permissible pressure drop Pm in the system. In this case, screen plug 10 has been advanced so far forward that the cavity is filled so quickly that the pressure drop is greater than threshold value Pm. As a consequence, screen plug 10 is retracted a distance d in step 52, and subsequently moved in again in step 43, but with a halved clock step 22. Thus, by halving clock step 22, the ventilation stop position is approached with tighter control.

A third case is one in which the difference between pressures P1 and P2 is greater than zero (or greater than a minimum pressure difference), but less than Pm. In this case, ventilation stop 50 is reached. Screen plug 10 now remains in this position until it has been completely filled. Operating parameters, such as the momentary position of screen plug 10 in the ventilation stop position, the type of fluid, and the system operating pressure, are subsequently stored in step 50.

For subsequent filling operations, it is now possible, depending on the fluid being used, either to move directly to the ventilation stop position identified as the optimal position, or to approach it in a targeted manner in order to speed up and optimize the process by means of these self-learning functions.

Figure 8:
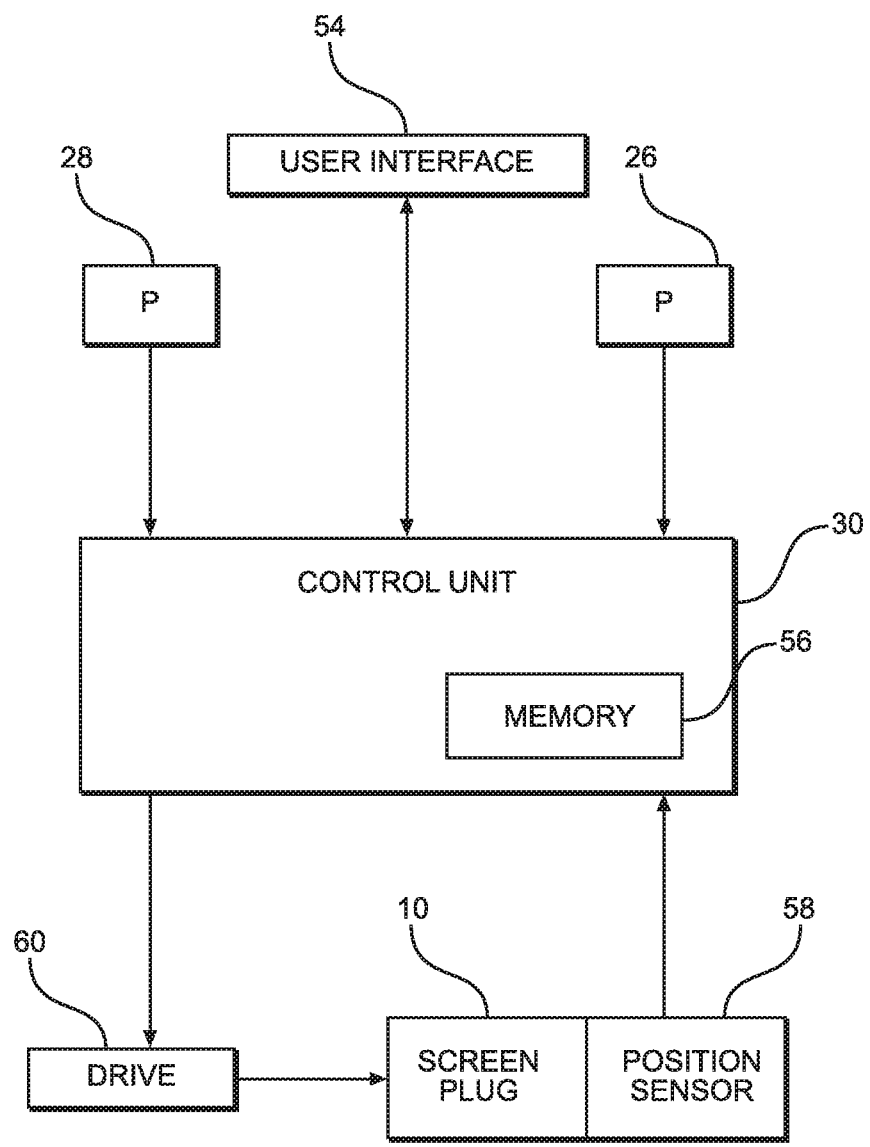
FIG. 8 shows a block diagram of a control unit according to the invention.

FIG. 8 shows in more detail the structure of control unit 30 and its interfaces. As already shown in FIGS. 5 and 6, control unit 30 receives pressure measurements from input pressure sensor 26 and/or from output pressure sensor 28. There is also a user interface 54 coupled to control unit 30. User interface 54 is connected bidirectionally to control unit 30, which is thus configured to receive data from user interface 54 and also to transfer data to the latter.

Control unit 30 controls drive means 60 by taking into account pressure measurements 26, 28 and user input entered at user interface 54. Said drive means 60 is coupled to screen plug 10 and is adapted to selectively influence the position of screen plug 10 relative to the surrounding housing 8. Screen plug 10 can thus be moved with the aid of drive means 60 into the screen replacement position, the filtering position and any other clock positions, for example to fill cavity 18 after a screen replacement.

The position of screen plug 10 is monitored by means of position sensor 58. The position of screen plug 10 is transferred to control unit 30 with the aid of position sensor 58.

Control unit 30 is specifically configured to carry out method 36. Control unit 30 also has a memory, in particular for storing parameters from method 36 and making them available for subsequent cycles.

Figure 9:
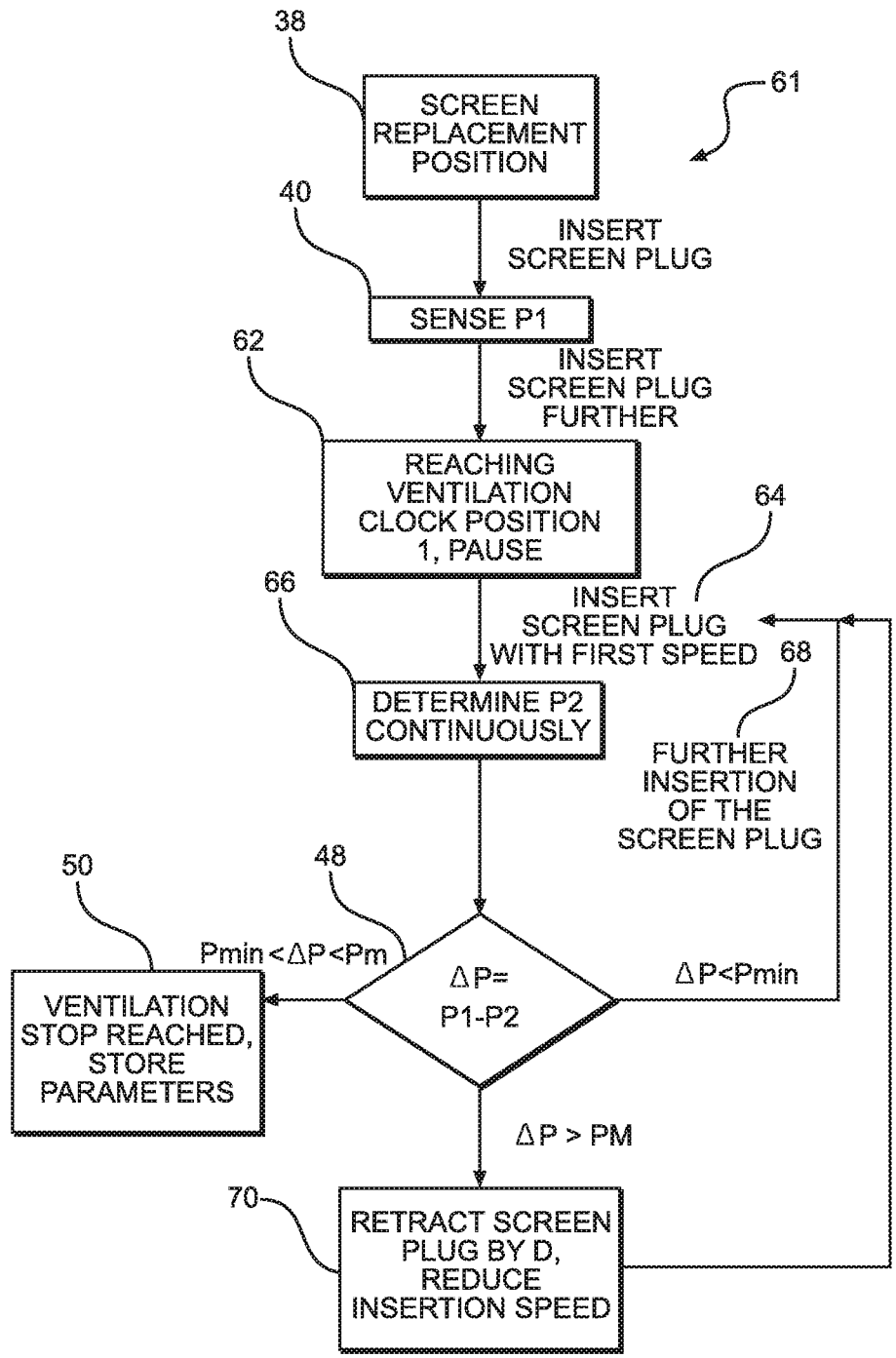
FIGS. 9 and 10 show block diagrams of alternative embodiments of control units according to the invention, for an alternative embodiment of a filtering device according to the invention.

FIG. 9 shows an alternative embodiment of a flow diagram 61 for operating a filtering device 2. Once again, screen replacement position 38 forms a starting point for the method. Screen plug 10 is located here in a position that allows filter element 11 to be replaced. In this position, screen plug 10 is not used to filter the fluid.

After filter element 11 has been replaced, screen plug 10 is moved partially into the corresponding screen plug receptacle 12. Before a first ventilation position 62 is reached, pressure P1 is measured in step 40. As already noted, said pressure P1 may include not only measurement of the input pressure of the filtering device by means of input pressure sensor 26, but also measurement of the output pressure of the filtering device by means of output pressure sensor 28, or a combination of both.

After ventilation position 1 has been reached (step 62), the screen plug is inserted continuously at a first feed speed in step 64. During insertion, pressure P2 is continuously measured in step 66. Pressure P2 may relate to the input pressure of the filtering device (input pressure sensor 26) and/or to the output pressure of the filtering device (output pressure sensor 28). This measured pressure P2 is subtracted in step 48 from the pressure P1 measured in step 40. Unlike the embodiment shown in FIG. 7, this occurs continuously while screen plug 10 is being inserted.

Depending on the result of subtraction in step 48, a distinction is made between three cases:

In a first case, no drop in pressure or minimum pressure drop Pmin has occurred yet during continuous insertion of screen plug 10, so screen plug 10 is inserted further in step 68. If, in contrast, the drop in pressure exceeds a maximum value Pm, the screen plug is retracted by a specific distance d in step 70 and is subsequently inserted again at a reduced feed speed. In this case, the method is performed anew, commencing with step 66. If the pressure drop calculated in step 48 is within a range which is greater than the minimum pressure drop Pmin and less than the maximum pressure drop Pm, then the ventilation stop position has been reached in step 50 and screen plug 10 remains in the respective position; cavity 18 is flooded.

Figure 10:
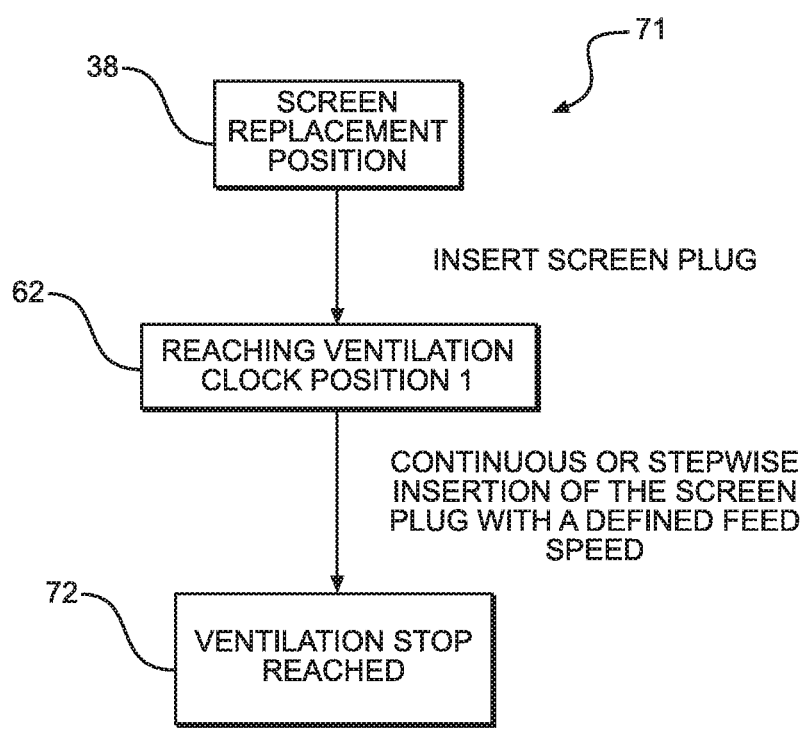

FIG. 10 shows another alternative embodiment of a flow diagram 71 for operating an alternative filtering device 2. According to this alternative embodiment, a pressure sensor is not necessary in order to carry out the method, or for the alternative filtering device 2 according to the invention.

Proceeding from screen replacement position 38, screen plug 10 is moved partially into the respective screen plug receptacle 12 and reaches a ventilation position 1 (step 62). Proceeding from this ventilation position 1, screen plug 10 is now inserted further, continuously or in step, with a defined, preferably slow feed speed. This is carried out until a ventilation stop position is reached in step 72. In this method, the screen plug 10 is inserted so slowly, using an appropriate definition of the insertion speed, that the respective pressure drop in the system is guaranteed not to exceed a defined maximum pressure drop. In this alternatively preferred method, there is no monitoring of pressure.

LIST OF REFERENCE SIGNS USED

2 Filtering device
4 Ventilation recess
6 Filling recess
8 Housing
10 Screen plug (screen carrier)
11 Filter element
12 Receptacle
14 Fluid inlet channel
16 Fluid outlet channel
18 Cavity
20 Screen plate
22 Clock step
24 Liquefying and conveying device 25 Applicator
26 Input pressure sensor
28 Output pressure sensor
30 Control unit
31 Hot melt adhesive application system
32 Input line
34 Output line
36 Flow diagram of the method
38 Screen replacement position
40 Pressure sensing P1
42 Reaching ventilation clock position 1, pause
44 Clock position
46 Pressure sensing P2
48 Comparison of pressures
50 Ventilation stop reached, storage of parameters for subsequent operations
52 Retracting the screen plug, halving the clock step
54 User interface
56 Memory
58 Position sensor
60 Drive means
61 Second flow diagram
62 Reaching ventilation position 1
64 Inserting the screen plug with a first feed speed
66 Determining P2 continuously
68 Further insertion of the screen plug
70 Retract screen plug distance d, reduce feed speed
74 Third flow diagram
72 Ventilation stop reached

What is claimed is:

1. A filtering device for filtering a fluid, the filtering device comprising:
 a housing having a receptacle, a fluid inlet channel, and a fluid outlet channel;
 a screen carrier movable inside said receptacle, the screen carrier having at least one cavity for receiving a screen support plate having a filter element,
  wherein the screen carrier is movable from a filtering position into a screen replacement position,
  wherein the screen carrier and/or the receptacle has a filling recess for filling the at least one cavity with fluid, which releases a flow cross-section having a size dependent on a position of the screen carrier in the receptacle to feed fluid from the fluid inlet channel and/or the fluid outlet channel into the at least one cavity, and
  wherein the screen carrier has at least one ventilation recess for releasing any air which is in the at least one cavity during filling; and
 a control unit configured to change the position and/or a feed speed of the screen carrier such that a fluid pressure in the fluid inlet channel and/or in the fluid outlet channel remains within predetermined pressure ranges while the at least one cavity is being filled,
 wherein the control unit is configured to change the position and/or the feed speed of the screen carrier in steps and repeatedly, or continuously, by means of control signals.

2. The filtering device of claim 1, wherein the fluid is a liquefied plastic.

3. The filtering device of claim 1, further comprising at least one pressure sensor configured to measure the fluid pressure in the fluid inlet channel and/or in the fluid outlet channel.

4. The filtering device of claim 1, wherein the screen carrier is axially movable inside the receptacle, and the filling recess extends substantially parallel to a longitudinal axis of the screen carrier.

5. The filtering device of claim 1, wherein the filling recess is a groove that has a change in cross-section in a direction of a longitudinal axis of the screen carrier and/or has a substantially triangular cross-section.

6. The filtering device of claim 1, wherein the screen carrier is driven by a linear motor or a stepper motor.

7. The filtering device of claim 1, wherein the screen carrier has a position sensor configured to determine the position of the screen carrier.

8. The filtering device of claim 7, wherein the position sensor is an ultrasonic transducer.

9. The filtering device of claim 1, wherein the control unit has a memory and the control unit is configured to adjust control parameters based on stored sensor data from previous filling operations.

10. The filtering device of claim 9, wherein the stored sensor data from previous filling operations comprise filling positions and feed speeds of the screen carrier and/or filling times for the at least one cavity.

11. The filtering device of claim 1, wherein the control unit comprises a user control panel and/or a touch-sensitive display.

12. The filtering device of claim 3, wherein the fluid is a liquefied plastic.

13. The filtering device of claim 3, wherein the screen carrier is axially movable inside the receptacle, and the filling recess extends substantially parallel to a longitudinal axis of the screen carrier.

14. The filtering device of claim 3, wherein the filling recess is a groove that has a change in cross-section in a direction of a longitudinal axis of the screen carrier and/or has a substantially triangular cross-section.

15. The filtering device of claim 3, wherein the screen carrier is driven by a linear motor or a stepper motor.

16. The filtering device of claim 3, wherein the screen carrier has a position sensor configured to determine the position of the screen carrier.

17. The filtering device of claim 16, wherein the position sensor is an ultrasonic transducer.

18. The filtering device of claim 3, wherein the control unit has a memory and the control unit is configured to adjust control parameters based on stored sensor data from previous filling operations.

19. The filtering device of claim 18, wherein the stored sensor data from previous filling operations comprise filling positions and feed speeds of the screen carrier and/or filling times for the at least one cavity.

20. The filtering device of claim 1, wherein the control unit is configured to change the position and the feed speed of the screen carrier such that the fluid pressure in the fluid inlet channel and/or in the fluid outlet channel remains within predetermined pressure ranges while the at least one cavity is being filled.

* * * * *